(12) United States Patent
Ryan et al.

(10) Patent No.: US 10,309,253 B2
(45) Date of Patent: Jun. 4, 2019

(54) GAS TURBINE ENGINE BLADE OUTER AIR SEAL PROFILE

(71) Applicant: United Technologies Corporation, Farmington, CT (US)

(72) Inventors: Kevin J. Ryan, Alfred, ME (US); Terence P. Tyler, Jr., East Waterboro, ME (US); Ken F. Blaney, Middleton, NH (US)

(73) Assignee: United Technologies Corporation, Farmington, CT (US)

( * ) Notice: Subject to any disclaimer, the term of this patent is extended or adjusted under 35 U.S.C. 154(b) by 727 days.

(21) Appl. No.: 14/994,186

(22) Filed: Jan. 13, 2016

(65) Prior Publication Data

US 2017/0198603 A1    Jul. 13, 2017

(51) Int. Cl.
*F02C 7/12* (2006.01)
*F01D 25/12* (2006.01)
*F02C 3/04* (2006.01)
*F01D 5/02* (2006.01)
*F01D 5/12* (2006.01)
*F01D 11/08* (2006.01)

(52) U.S. Cl.
CPC ............... *F01D 25/12* (2013.01); *F01D 5/02* (2013.01); *F01D 5/12* (2013.01); *F01D 11/08* (2013.01); *F02C 3/04* (2013.01); *F05D 2220/32* (2013.01); *F05D 2240/35* (2013.01); *F05D 2260/202* (2013.01)

(58) Field of Classification Search
CPC . F01D 11/08; F01D 25/12; F01D 5/02; F01D 5/12; F01D 5/141; F02C 3/04; F05D 2220/32; F05D 2240/35; F05D 2250/74; F05D 2260/202
See application file for complete search history.

(56) References Cited

U.S. PATENT DOCUMENTS

| | | |
|---|---|---|
| 7,665,961 B2 | 2/2010 | Lutjen et al. |
| 8,596,962 B1 | 12/2013 | Liang |
| 8,622,693 B2 | 1/2014 | Di Paola et al. |
| 8,707,712 B2 | 4/2014 | Spangler et al. |
| 8,716,623 B2 | 5/2014 | Lutjen et al. |
| 9,080,458 B2 | 7/2015 | Romanov |
| 9,103,225 B2 | 8/2015 | Lutjen et al. |
| 9,169,739 B2 | 10/2015 | Mironets et al. |

*Primary Examiner* — Jesse Bogue

(74) *Attorney, Agent, or Firm* — Carlson, Gaskey & Olds, P.C.

(57) ABSTRACT

A blade outer air seal for a gas turbine engine includes a gas path surface exposed to exhaust gas flow, a first side extending radially outward from the gas path surface, a second side extending radially outward from the gas path surface, and a plurality of film cooling holes disposed on at least one of the gas path surface. The first side and the second side, the film cooling holes are disposed at locations described by a set of Cartesian coordinates set forth in Table 1. The Cartesian coordinates are provided by an axial coordinate, a circumferential coordinate and a radial coordinate relative to a defined point of origin. A gas turbine engine is also disclosed.

13 Claims, 4 Drawing Sheets

GAS TURBINE ENGINE BLADE OUTER AIR SEAL PROFILE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. Leakage around vanes and blades reduces efficiency of the turbine section. Blade outer air seals control leakage of gas flow and improve engine efficiency. All structures within the exhaust gas flow path are exposed to the extreme temperatures. A cooling air flow is therefore utilized over some structures to improve durability and performance

SUMMARY

In a featured embodiment, a blade outer air seal for a gas turbine engine includes a gas path surface exposed to exhaust gas flow, a first side extending radially outward from the gas path surface, a second side extending radially outward from the gas path surface, and a plurality of film cooling holes disposed on at least one of the gas path surface. The first side and the second side, the film cooling holes are disposed at locations described by a set of Cartesian coordinates set forth in Table 1. The Cartesian coordinates are provided by an axial coordinate, a circumferential coordinate and a radial coordinate relative to a defined point of origin.

In another embodiment according to the previous embodiment, includes an axially forward side and an axially aft side. The gas path surface and the forward side define an arc and the point of origin is defined at the center of curvature of the arc on the forward side.

In another embodiment according to any of the previous embodiments, the forward side and the aft side include features for securement to a support structure within the turbine section of the gas turbine engine.

In another embodiment according to any of the previous embodiments, the blade outer air seal is one of a plurality of outer air seals disposed circumferentially about a longitudinal axis of the gas turbine engine.

In another embodiment according to any of the previous embodiments, each of the film cooling air holes are located within a true position of 0.023 inches (0.58 mm).

In another embodiment according to any of the previous embodiments, at least some of the film cooling air holes include one of a conical and cylindrical shape.

In another embodiment according to any of the previous embodiments, each of the film cooling air holes correspond with a passage through the corresponding surface and at least some of the passages are disposed at an angle different than normal relative to the surface.

In another embodiment according to any of the previous embodiments, a plurality of film cooling holes have a diameter within a range of 0.010-0.035 inch (0.25-0.89 mm).

In another featured embodiment, a gas turbine engine includes a compressor section disposed about an axis. A combustor is in fluid communication with the compressor section. A turbine section is in fluid communication with the combustor. The turbine section includes at least one rotor having a plurality of rotating blades. A plurality of blade outer air seals circumferentially surrounds the rotating blades. Each of the blade outer air seals includes a gas path surface exposed to exhaust gas flow, a first side extending radially outward from the gas path surface, a second side extending radially outward from the gas path surface, and a plurality of film cooling holes disposed on at least one of the gas path surface. The first side and the second side, the film cooling holes are disposed at locations described by a set of Cartesian coordinates set forth in Table 1. The Cartesian coordinates are provided by an axial coordinate, a circumferential coordinate and a radial coordinate relative to a zero-coordinate.

In another embodiment according to any of the previous embodiments, each of the blade outer air seals includes an axially forward side and an axially aft side. The gas path surface and the forward side define an arc and the zero-coordinate is defined at the center of curvature of the arc on the forward side.

In another embodiment according to any of the previous embodiments, the forward side and the aft side include features for securement to a support structure within the turbine section of the gas turbine engine.

In another embodiment according to any of the previous embodiments, each of the plurality of film cooling air holes are located within a true position of 0.023 inches (0.58 mm).

In another embodiment according to any of the previous embodiments, at least some of the plurality of film cooling air holes include one of a conical and cylindrical shape.

In another embodiment according to any of the previous embodiments, each of the plurality of film cooling air holes are in communication with a corresponding plurality of passages and at least some of the passages are disposed at an angle different than normal relative to the surface.

In another embodiment according to any of the previous embodiments, a plurality of film cooling holes have a diameter within a range of 0.010-0.035 inch (0.25-0.89 mm).

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
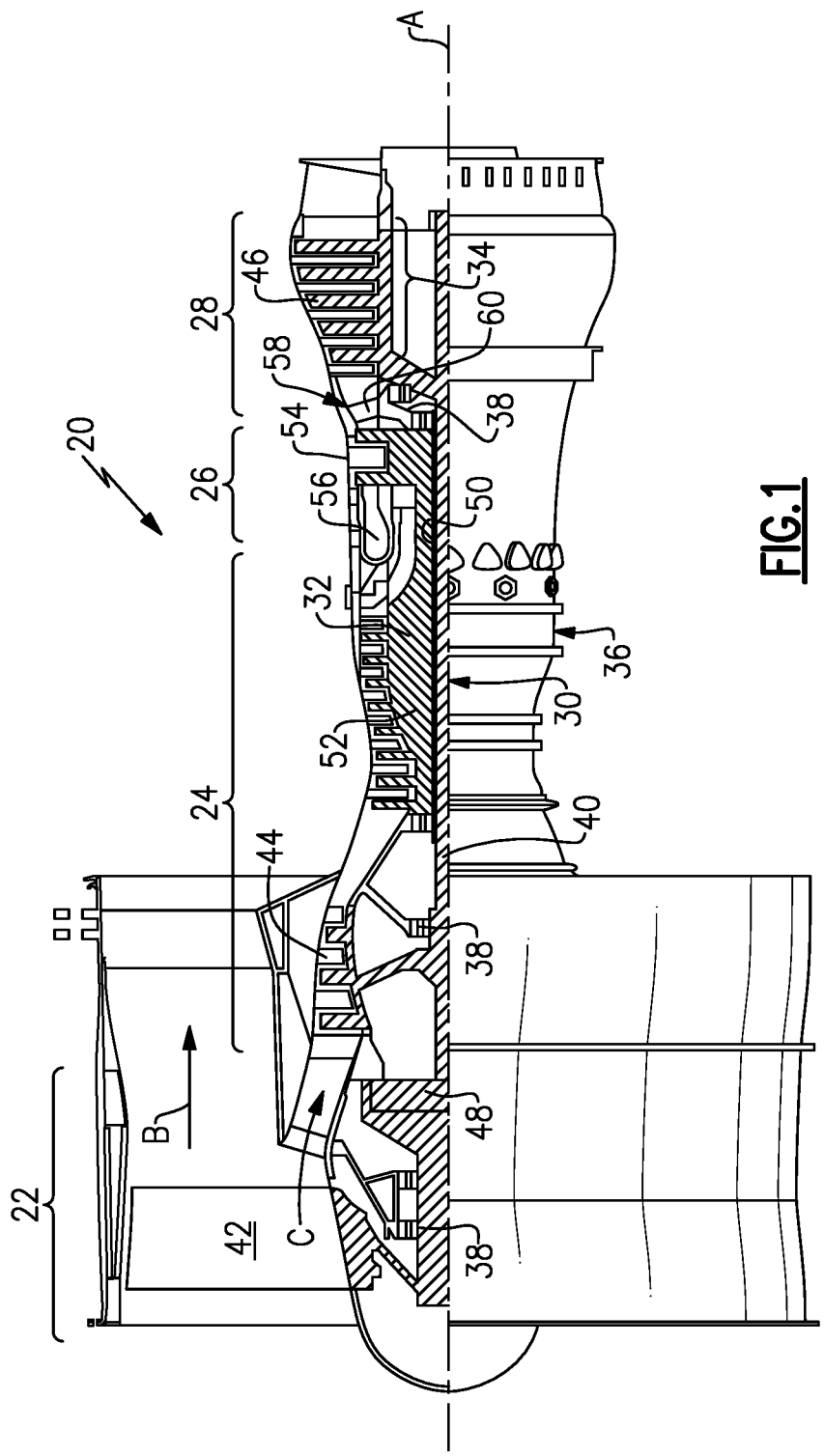
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ("TSFC")"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]0.5$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
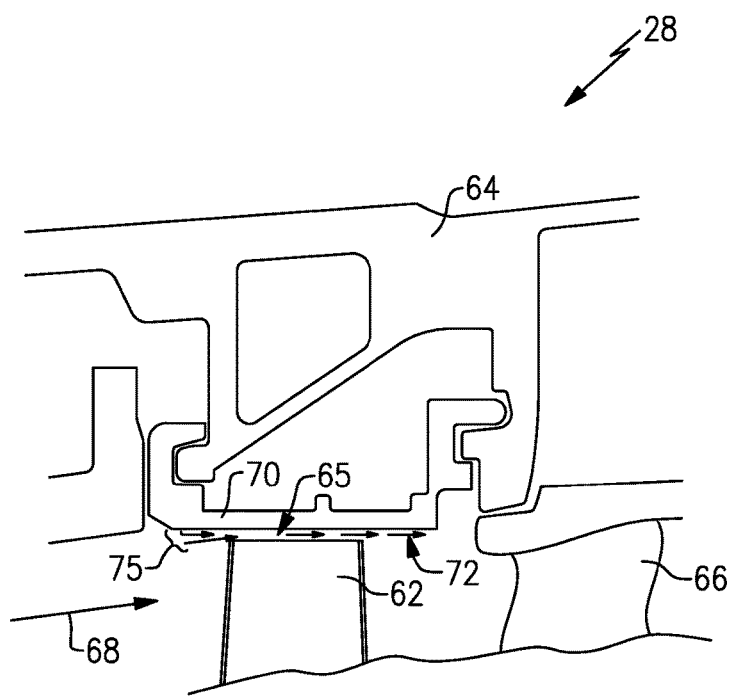
FIG. 2 is a schematic view of a portion of a turbine section of a gas turbine engine.

Referring to FIG. 2, the example turbine section 28 includes at least one rotor 34 having a turbine blade 62. The turbine blade 62 includes a tip 65 disposed adjacent to a blade outer air seal 70 (BOAS). A stationary vane 66 is mounted and supported within the case 64 on at least one side of the turbine blade 62 for directing gas flow into the next turbine stage. The BOAS 70 is disposed adjacent to the tip 65 to provide a desired clearance between the tip 65 and a gas path surface 72 of the BOAS 70. The clearance provides for increase efficiency with regard to the extraction of energy from the high energy gas flow indicated by arrow 68.

The turbine blade 62 and vane 66 along with the blade outer air seal are exposed to the high-energy exhaust gas flow 68. The high energy exhaust gas flow 68 is at an elevated temperature and thereby structures such as the blade 62, vane 66 and the BOAS 70 are fabricated from materials capable of withstanding the extremes in temperature. Moreover, each of these structures may include provisions for generating a cooling film air flow 75 over the surfaces. The cooling film air flow generates a boundary layer that aids in survivability for the various structures within the path of the exhaust gasses 68.

In the discloses example, a plurality of BOAS 70 are supported within the case 64 and abut each other to form a circumferential boundary radially outward of the tip 65. Accordingly, at least one stage of the turbine section 28 includes a plurality of BOAS 70 that define a radial clearance between the tip 65 and the gas path surface 72. Additional stages in the turbine section 28 will include additional BOAS to define the radial clearance with turbine blades of each stage.

Figure 3:
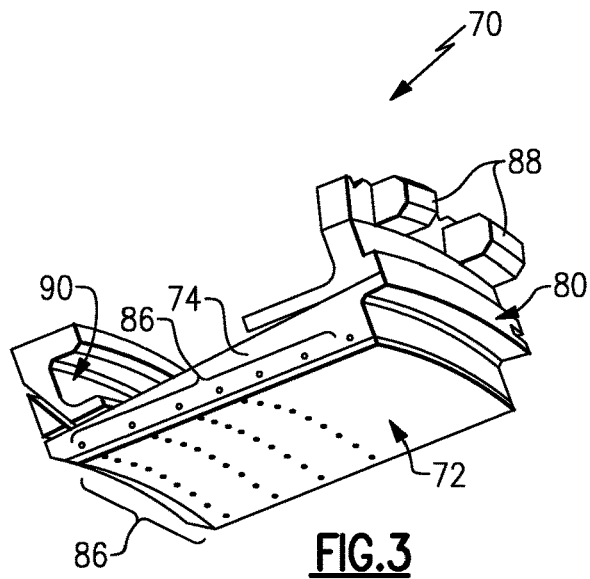
FIG. 3 is a perspective view of an example blade outer air seal.
Figure 4:
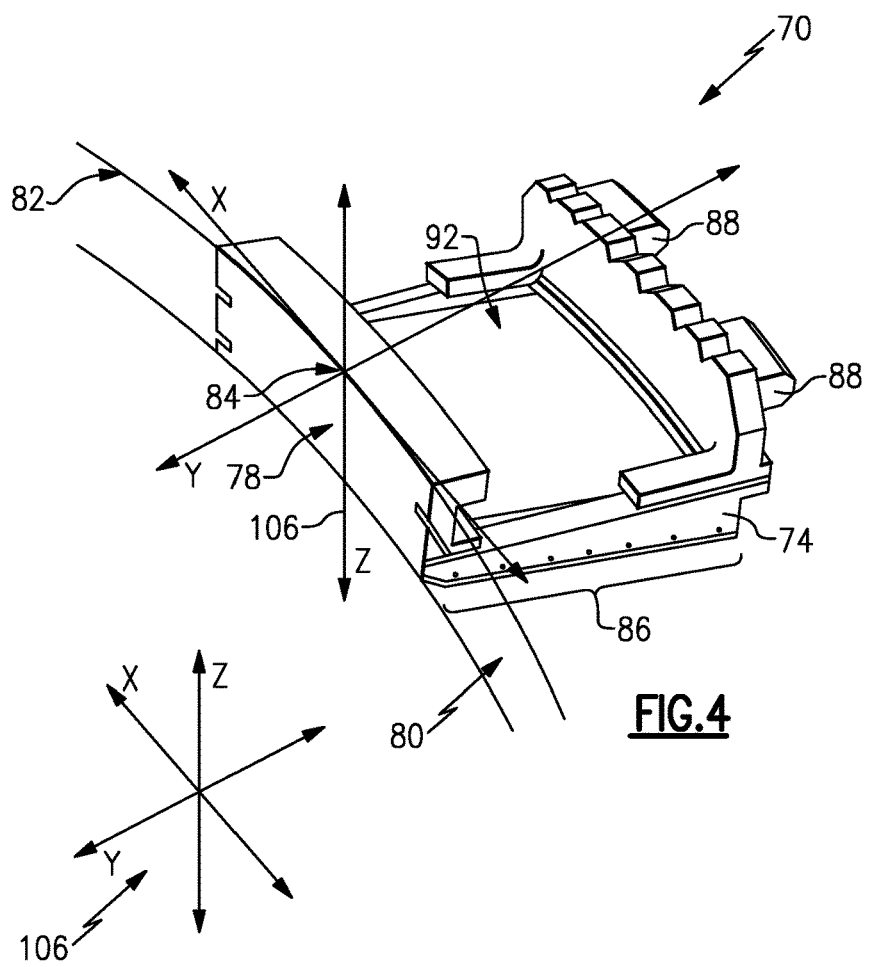
FIG. 4 is a another perspective view of the example blade outer air seal.

Referring to FIGS. 3 and 4 with continued reference to FIG. 2, the BOAS 70 includes a plurality of film cooling holes 86 for generating a film cooling air flow, indicated at 75 in FIG. 2, along the gas path surface 72. The film cooling holes 86 are disposed on surfaces exposed to the exhaust gasses 68. It should be understood that the term "holes" is used by way of description and not intended to limit the shape to a round opening. Accordingly, the example holes 86 maybe round, oval, square or any other shape desired.

Figure 5:
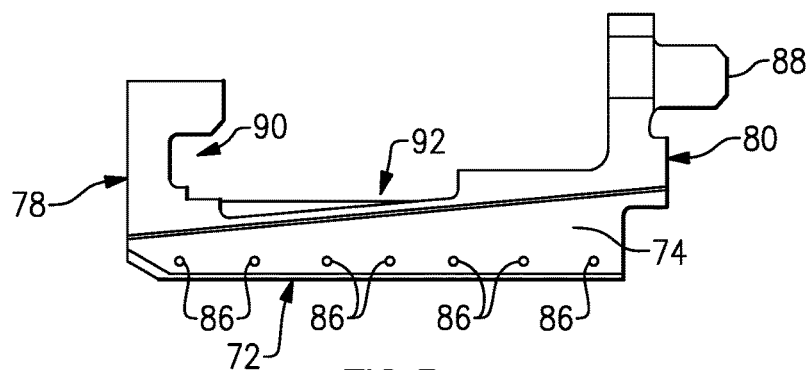
FIG. 5 is a first side view of an example blade outer air seal.
Figure 6:
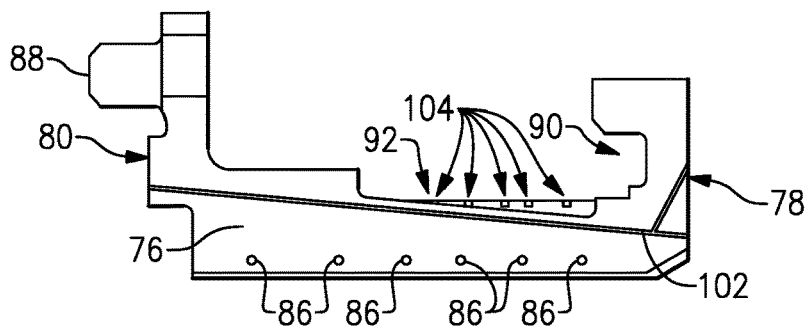
FIG. 6 is a second side view of an example blade outer air seal.

Referring to FIGS. 5 and 6 with continued reference to FIGS. 3 and 4, the example BOAS 70 includes the gas path surface 72 that is exposed directly to the exhaust gasses 68. The BOAS 70 further includes a first side 74 and a second side 76. The first and second sides 74, 76 abut adjacent BOASs disposed circumferentially about the turbine case 64. Each of the BOASs 70 includes a forward surface 78 and an aft surface 80. The forward surface 78 and aft surface 80 includes support features for holding each BOAS within the turbine case 64. In this example, the BOAS 70 includes a forward channel 90 and an aft tab 88 to conform to features within the turbine cases 64 to support the BOAS 70 circumferentially about the corresponding turbine blade 62.

The first side 74 and second side 76 and a gas path surface 72 all include a plurality of film cooling holes 86. Each of the film cooling holes 86 provide a pathway for cooling air to generate the boundary layer of cooling air flow 75 to maintain the BOAS within defined temperature ranges. A specific location of the film cooling holes 86 is devised to provide cooling air flow coverage of features susceptible to the high temperature exhaust gasses. The cooling holes 86 are arranged to produce boundary layers of cooling flow along the gas path surface 72 along with the first side 74 and the second side 76. As appreciated, the first side and second side provide the cooling air holes 86 to inject cooling flow between adjacent blade outer air seals 70.

The location of the cooling holes 86 are described in terms of Cartesian coordinates indicated by the axes 106 that includes X, Y and Z axes which correspond to the axial direction (Y), the circumferential direction (X), and the radial direction (Z) as is shown in FIG. 4 relative to a point of origin indicated at 84. The locations for the cooling holes 86 correspond to the location where the holes break through the surface of either the first side 74, the second 76 or the gas path surface 72.

The coordinates of the cooling holes are set forth in Table 1 (shown below), provide for the circumferential, radial and axial location relative to the point of origin 84 on the BOAS 70. Each row in Table 1 corresponds with a center line location of an individual hole on one of the first side 74, second side 76 and the gas path surface 72. Moreover, each row includes minimum and maximum locations for the each of the holes 86 for each coordinate point. Table 1 includes non-dimensional locations relative to the point of origin 84. In this example, the point of origin 84 is disposed on an arc 82 of the forward surface 78. The point of origin 84 is disposed at the center of curvature 80 that defines the circumferential radius of the plurality of BOAS around the specific turbine rotor section.

TABLE 1

| Hole | $X_{min}$ | $X_{max}$ | $Y_{min}$ | $Y_{max}$ | $Z_{min}$ | $Z_{max}$ |
| --- | --- | --- | --- | --- | --- | --- |
| 1 | −0.665 | −0.661 | −0.106 | −0.105 | 0.947 | 0.951 |
| 2 | −0.518 | −0.515 | −0.112 | −0.112 | 0.949 | 0.952 |
| 3 | −0.363 | −0.361 | −0.108 | −0.108 | 0.950 | 0.954 |
| 4 | −0.223 | −0.222 | −0.118 | −0.117 | 0.951 | 0.954 |
| 5 | −0.075 | −0.075 | −0.118 | −0.117 | 0.951 | 0.955 |
| 6 | 0.073 | 0.073 | −0.118 | −0.117 | 0.951 | 0.955 |
| 7 | 0.220 | 0.222 | −0.118 | −0.117 | 0.951 | 0.954 |
| 8 | 0.368 | 0.370 | −0.118 | −0.117 | 0.950 | 0.953 |
| 9 | 0.515 | 0.518 | −0.118 | −0.117 | 0.949 | 0.952 |
| 10 | 0.662 | 0.666 | −0.118 | −0.117 | 0.947 | 0.950 |
| 11 | −0.669 | −0.665 | −0.274 | −0.273 | 0.946 | 0.950 |
| 12 | −0.515 | −0.513 | −0.280 | −0.279 | 0.948 | 0.951 |
| 13 | −0.330 | −0.329 | −0.266 | −0.264 | 0.950 | 0.953 |
| 14 | −0.183 | −0.182 | −0.265 | −0.264 | 0.950 | 0.954 |
| 15 | −0.041 | −0.041 | −0.265 | −0.264 | 0.951 | 0.954 |
| 16 | 0.101 | 0.101 | −0.265 | −0.264 | 0.951 | 0.954 |
| 17 | 0.242 | 0.243 | −0.265 | −0.264 | 0.950 | 0.954 |
| 18 | 0.383 | 0.385 | −0.265 | −0.264 | 0.949 | 0.953 |
| 19 | 0.524 | 0.527 | −0.265 | −0.264 | 0.948 | 0.951 |
| 20 | 0.665 | 0.669 | −0.265 | −0.264 | 0.946 | 0.950 |
| 21 | −0.660 | −0.656 | −0.486 | −0.484 | 0.946 | 0.950 |
| 22 | −0.489 | −0.487 | −0.449 | −0.447 | 0.948 | 0.952 |
| 23 | −0.338 | −0.336 | −0.449 | −0.447 | 0.950 | 0.953 |
| 24 | −0.109 | −0.108 | −0.433 | −0.431 | 0.951 | 0.954 |
| 25 | 0.047 | 0.047 | −0.433 | −0.431 | 0.951 | 0.954 |
| 26 | 0.201 | 0.202 | −0.433 | −0.431 | 0.950 | 0.954 |
| 27 | 0.356 | 0.358 | −0.433 | −0.431 | 0.949 | 0.953 |
| 28 | 0.510 | 0.513 | −0.433 | −0.431 | 0.948 | 0.952 |
| 29 | 0.665 | 0.668 | −0.433 | −0.431 | 0.946 | 0.950 |
| 30 | −0.660 | −0.656 | −0.625 | −0.622 | 0.946 | 0.950 |
| 31 | −0.505 | −0.502 | −0.625 | −0.622 | 0.948 | 0.952 |
| 32 | −0.263 | −0.262 | −0.567 | −0.564 | 0.950 | 0.953 |
| 33 | −0.108 | −0.107 | −0.567 | −0.564 | 0.951 | 0.954 |
| 34 | 0.047 | 0.048 | −0.567 | −0.564 | 0.951 | 0.954 |
| 35 | 0.202 | 0.203 | −0.567 | −0.564 | 0.950 | 0.954 |
| 36 | 0.357 | 0.359 | −0.567 | −0.564 | 0.949 | 0.953 |
| 37 | 0.511 | 0.514 | −0.567 | −0.564 | 0.948 | 0.951 |
| 38 | 0.665 | 0.669 | −0.567 | −0.564 | 0.946 | 0.950 |
| 39 | −0.722 | −0.718 | −0.103 | −0.102 | 0.955 | 0.958 |
| 40 | −0.722 | −0.718 | −0.256 | −0.255 | 0.955 | 0.958 |
| 41 | −0.722 | −0.718 | −0.413 | −0.411 | 0.955 | 0.958 |
| 42 | −0.722 | −0.718 | −0.544 | −0.541 | 0.955 | 0.958 |
| 43 | −0.722 | −0.718 | −0.658 | −0.655 | 0.955 | 0.958 |
| 44 | −0.722 | −0.718 | −0.806 | −0.802 | 0.955 | 0.958 |
| 45 | −0.722 | −0.718 | −0.959 | −0.954 | 0.955 | 0.958 |
| 46 | 0.718 | 0.722 | −0.892 | −0.887 | 0.955 | 0.958 |
| 47 | 0.718 | 0.722 | −0.710 | −0.706 | 0.955 | 0.958 |
| 48 | 0.718 | 0.722 | −0.586 | −0.583 | 0.955 | 0.958 |
| 49 | 0.718 | 0.722 | −0.474 | −0.471 | 0.955 | 0.958 |
| 50 | 0.718 | 0.722 | −0.356 | −0.354 | 0.955 | 0.958 |
| 51 | 0.718 | 0.722 | −0.221 | −0.220 | 0.955 | 0.958 |

Each location set forth in Table 1 is where the center line of each cooling hole 86 breaks through the surface. Additional elements such as additional cooling holes, protective coatings, and other specific features that would be provided in the BOAS 70 are not described by the coordinates provided in Table 1.

Manufacturing tolerances are recognized for the fabrication of BOAS 70. Accordingly, the table indicates the tolerance with a minimum and maximum locations relative to each coordinate point for each location. Moreover, each hole may deviate from a true position with a tolerance of about 0.023 inches (0.58 mm) from a center line of the hole. The specific tolerance is with regard to the location of each of the holes and generally not scalable although the coordinates provided in the table are non-dimensional and are therefore scalable relative to the sizes of the blade outer air seal.

Figure 7:
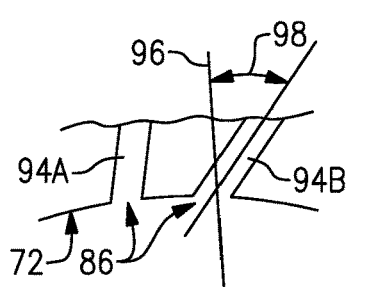
FIG. 7 is a schematic view through a film cooling hole.

Referring to FIG. 7, with continued reference to FIGS. 3, 4, 5 and 6, each of the holes 86 is in communication with at least one passage such as those indicated at 94a and 94b. The passages 94a and 94b communicate cooling air flow from a supply in communication with openings on a top side 92 of each BOAS 70. In this example as is shown in FIG. 6, several passages 102 are provided through the BOAS 70 to communicate cooling air flow to the film cooling holes 86.

At least one of the passages, for example passage 94b is disposed at an angle 98 relative to normal 96 to the corresponding surface for that opening 86. Some of the passages, for example passage 94A may be disposed normal to the surface through which the opening extends.

Figure 8A:
FIG. 8A is a schematic view of a film cooling hole.
Figure 8B:
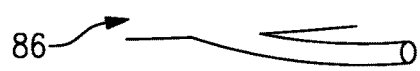
FIG. 8B is a cross-section schematic view of the film cooling hole of FIG. 8A.

Referring to FIGS. 8A and 8B, the holes may include a conical shape corresponding to a generally oblong opening through the surface. This oblong opening provides a direction of air flow once it exits the holes 86 to provide the desired flow pattern for cooling air flow. Moreover, the holes 86 may be cylindrically shaped.

Figure 9:
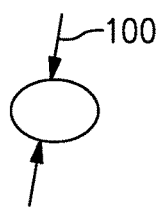
FIG. 9 is a schematic view of an example film cooling hole.

Referring to FIG. 9, each of the openings generally include a diameter 100 that is measured at least the largest portion of the opening that is within a tolerance range of 0.010 to 0.035 inches (0.25-0.89 mm).

Referring back to FIGS. 3, 4 and Table 1, the location of each film cooling hole 86 is defined according to the table in the circumferential (X), axial (Y) and radial direction relative to the zero point 84. The locations are not directional, meaning they indicate a center line of the opening regardless of the orientation of the surface through which it extends. Accordingly, Table 1 defines locations of openings on each of the first and second sides 74, 76 that are substantially transverse to the gas path surface 72.

Moreover, Table 1 is non-dimensional and scalable and conformance to the disclosed film cooling hole locations is provided by selecting specific particular values for the scaling parameters in inches or millimeters. Substantial conformance is based on points representing the cooling hole locations for example, in inches or millimeters as determined by selecting particular values of the scaling parameters.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A blade outer air seal for a gas turbine engine comprising:
    a gas path surface exposed to exhaust gas flow;
    a first side extending radially outward from the gas path surface;
    a second side extending radially outward from the gas path surface;
    an axially forward side and an axially aft side, wherein the gas path surface and the axially forward side define an arc and a point of origin is defined at the center of curvature of the arc on the axially forward side; and
    a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to the defined point of origin.

2. The blade outer air seal as recited in claim 1, wherein the forward side and the aft side include features for securement to a support structure within the turbine section of the gas turbine engine.

3. The blade outer air seal as recited in claim 1, the blade outer air seal is one of a plurality of outer air seals disposed circumferentially about a longitudinal axis of the gas turbine engine.

4. The blade outer air seal as recited in claim 1, wherein each of the film cooling air holes are located within a true position of 0.023 inches (0.58 mm).

5. The blade outer air seal as recited in claim 1, wherein at least some of the film cooling air holes comprise one of a conical and cylindrical shape.

6. The blade outer air seal as recited in claim 1, wherein each of the film cooling air holes correspond with a passage through the corresponding surface and at least some of the passages are disposed at an angle different than normal relative to the surface.

7. The blade outer air seal as recited in claim 1, wherein a plurality of film cooling holes have a diameter within a range of 0.010-0.035 inch (0.25-0.89 mm).

8. A gas turbine engine comprising:
    a compressor section disposed about an axis;
    a combustor in fluid communication with the compressor section;
    a turbine section in fluid communication with the combustor, the turbine section includes at least one rotor having a plurality of rotating blades; and
    a plurality of blade outer air seals circumferentially surrounding the rotating blades, wherein each of the blade outer air seals includes:
    a gas path surface exposed to exhaust gas flow;
    a first side extending radially outward from the gas path surface;
    a second side extending radially outward from the gas path surface;
    an axially forward side and an axially aft side, wherein the gas path surface and the axially forward side define an arc and a zero-coordinate is defined at the center of curvature of the arc on the axially forward side; and
    a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to the zero-coordinate.

9. The gas turbine engine as recited in claim 8, wherein the forward side and the aft side include features for securement to a support structure within the turbine section of the gas turbine engine.

10. The gas turbine engine as recited in claim 8, wherein each of the plurality of film cooling air holes are located within a true position of 0.023 inches (0.58 mm).

11. The gas turbine engine as recited in claim 8, wherein at least some of the plurality of film cooling air holes comprise one of a conical and cylindrical shape.

12. The gas turbine engine as recited in claim 8, wherein each of the plurality of film cooling air holes are in communication with a corresponding plurality of passages and at least some of the passages are disposed at an angle different than normal relative to the surface.

13. The gas turbine engine as recited in claim 8, wherein a plurality of film cooling holes have a diameter within a range of 0.010-0.035 inch (0.25-0.89 mm).

* * * * *